United States Patent
Shihoh

(10) Patent No.: US 9,207,462 B2
(45) Date of Patent: Dec. 8, 2015

(54) CORRECTION OPTICAL APPARATUS, IMAGE BLUR CORRECTION APPARATUS, AND IMAGE CAPTURING APPARATUS

(71) Applicant: CANON KABUSHIKI KAISHA, Tokyo (JP)

(72) Inventor: Makoto Shihoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 14/090,162

(22) Filed: Nov. 26, 2013

(65) Prior Publication Data

US 2014/0160566 A1 Jun. 12, 2014

(30) Foreign Application Priority Data

Dec. 6, 2012 (JP) .................................. 2012-267686

(51) Int. Cl.
| | |
|---|---|
| H04N 5/232 | (2006.01) |
| G02B 27/64 | (2006.01) |
| G03B 5/00 | (2006.01) |
| G02B 7/02 | (2006.01) |
| H04N 5/225 | (2006.01) |

(52) U.S. Cl.
CPC .............. *G02B 27/646* (2013.01); *G02B 7/023* (2013.01); *G03B 5/00* (2013.01); *H04N 5/2254* (2013.01); *H04N 5/23258* (2013.01); *H04N 5/23287* (2013.01); *G03B 2205/0015* (2013.01); *G03B 2205/0069* (2013.01)

(58) Field of Classification Search
CPC .......... H04N 5/23264; H04N 5/23248; H04N 5/23287; G03B 2205/0007
See application file for complete search history.

(56) References Cited

U.S. PATENT DOCUMENTS

| | | | |
|---|---|---|---|
| 5,881,324 A | 3/1999 | Imada | |
| 6,400,902 B1 | 6/2002 | Usui | |
| 7,755,666 B2 * | 7/2010 | Noji | ........................ 348/208.11 |
| 8,027,578 B2 | 9/2011 | Imada | |

(Continued)

FOREIGN PATENT DOCUMENTS

| | | |
|---|---|---|
| CN | 101414094 A | 4/2009 |
| CN | 101561616 A | 10/2009 |

(Continued)

OTHER PUBLICATIONS

Mar. 17, 2014 European Search Report in European Patent Appln. No. 13195417.4.

(Continued)

*Primary Examiner* — James Hannett
(74) *Attorney, Agent, or Firm* — Fitzpatrick, Cella, Harper & Scinto

(57) ABSTRACT

A correction optical apparatus configured to correct an image blur includes a rotating member rotatably supported, a sliding member movable in a first direction, a movable member configured to be movable in a second direction and support a correction lens, a first driving unit provided between the rotating member and the sliding member, and a second driving unit provided between the sliding member and the movable member. The image blur is corrected by driving of the first and second driving units. When the image blur correction is not to be performed, a regulating member provided on the rotating member is made to engage with an engaging portion provided on the movable member by driving of the first driving unit, thereby regulating translation of the movable member.

20 Claims, 8 Drawing Sheets

(56) References Cited

U.S. PATENT DOCUMENTS

| | | |
|---|---|---|
| 8,086,097 B2 | 12/2011 | Sato |
| 8,125,711 B2 | 2/2012 | Kimura |
| 8,218,958 B2 | 7/2012 | Sato |
| 8,737,829 B2 * | 5/2014 | Shihoh ............................ 396/55 |
| 9,049,375 B2 | 6/2015 | Wade et al. |
| 2008/0187301 A1 | 8/2008 | Takahashi |
| 2008/0291540 A1 * | 11/2008 | Nakamura et al. ............ 359/554 |
| 2009/0097833 A1 | 4/2009 | Imada |
| 2009/0262425 A1 | 10/2009 | Kimura |
| 2011/0013283 A1 | 1/2011 | Sato |
| 2011/0249336 A1 | 10/2011 | Sato |
| 2011/0310484 A1 | 12/2011 | Okamura |
| 2012/0154912 A1 | 6/2012 | Shihoh |
| 2012/0249813 A1 | 10/2012 | Miyasako |
| 2013/0100304 A1 | 4/2013 | Wade et al. |
| 2015/0124108 A1 | 5/2015 | Wade et al. |

FOREIGN PATENT DOCUMENTS

| | | |
|---|---|---|
| EP | 1650595 A2 | 4/2006 |
| JP | 3397536 B2 | 4/2003 |
| JP | 2008-287158 A | 11/2008 |
| JP | 2011-022250 A | 2/2011 |
| JP | 2011-257556 A | 12/2011 |
| WO | 2008/023815 A1 | 2/2008 |

OTHER PUBLICATIONS

Jul. 25, 2014 European Search Report in European Patent Appln. No. 13195417.4.

Jul. 16, 2015 Chinese Official Action in Chinese Patent Appln. No. 201310637387.7.

* cited by examiner

CORRECTION OPTICAL APPARATUS, IMAGE BLUR CORRECTION APPARATUS, AND IMAGE CAPTURING APPARATUS

BACKGROUND OF THE INVENTION

1. Field of the Invention

The present invention relates to a correction optical apparatus for correcting an image blur and an image capturing apparatus and, more particularly, to a correction optical apparatus including a holding mechanism that holds a correction lens or an image sensor to be moved for correction in a state in which movement is regulated when correction is not to be performed, an image blur correction apparatus, and an image capturing apparatus.

2. Description of the Related Art

Conventionally known is a correction optical apparatus including a correction optical system that prevents an image blur by translating a correction lens in a plane perpendicular to the optical axis.

Some correction optical apparatuses include a holding mechanism configured to regulate movement of a movable portion for supporting the correction lens and fix the movable portion when the image blur correction is not to be performed.

Japanese Patent No. 03397536 discloses a correction optical apparatus including such a holding mechanism that regulates the movement of the correction lens by rotating a lock ring and thus engaging the projections of a correction lens support frame with the inner surface of the lock ring.

SUMMARY OF THE INVENTION

However, in Japanese Patent No. 03397536, a driving unit for rotating the lock ring is necessary to change the movable portion including the correction lens from the fixed state to the movable state, that is, the correction enable state.

In addition, an actuator that holds the lock ring in the correction enable state is separately needed. For this reason, the apparatus is not necessarily satisfactory because of, for example, increases in the size, cost, and power consumption.

The present invention provides a correction optical apparatus, an image blur correction apparatus, and an image capturing apparatus which can reduce the size, cost, and power consumption.

According to an aspect of the present invention, there is provided a correction optical apparatus comprising: a fixed member; a rotating member configured to be rotatable with respect to the fixed member in a plane perpendicular to an optical axis of the correction optical apparatus; a sliding member configured to be movable with respect to the fixed member in a first direction in the plane perpendicular to the optical axis of the correction optical apparatus; a movable member configured to be movable with respect to the sliding member in a second direction crossing the first direction in the plane perpendicular to the optical axis of the correction optical apparatus; a first driving unit provided between the rotating member and the sliding member; and a second driving unit provided between the sliding member and the movable member, wherein the rotating member includes a regulating member, and wherein the movable member includes an engaging portion configured to be able to engage with the regulating member in a rotation direction of the rotating member.

According to another aspect of the present invention, there is provided a correction optical apparatus configured to correct an image blur, comprising: a fixed member; a rotating member configured to be rotatable with respect to the fixed member in a first plane perpendicular to an optical axis of the correction optical apparatus; a sliding member configured to be movable with respect to the fixed member in a first direction to translate the correction lens with respect to the fixed member in the first plane; a movable member configured to hold the correction lens and be movable with respect to the sliding member in a second direction crossing the first direction; a first driving unit provided between the rotating member and the sliding member; and a second driving unit provided between the sliding member and the movable member, wherein the first driving unit and the second driving unit are configured to drive the movable member relative to the fixed member in a second plane perpendicular to the optical axis of the correction lens to correct the image blur by the correction lens, wherein the first driving unit is configured to rotate the rotating member in the second plane to make a regulating member provided on the rotating member, when the correction of the image blur is not to be performed, engage with an engaging portion formed on the movable member, thereby regulating the translation of the movable member, and wherein the regulating member is configured to be disengaged from the engaging portion to enable the movable member to translate when the correction of the image blur is to be performed.

According to still another aspect of the present invention, there is provided an image blur correction apparatus comprising: a fixed member; a rotating member configured to be rotatable with respect to the fixed member in a plane parallel to a light receiving surface of an image sensor; a sliding member configured to be movable with respect to the fixed member in a first direction in the plane; a movable member configured to be movable with respect to the sliding member in a second direction crossing the first direction in the plane; a first driving unit provided between the rotating member and the sliding member; and a second driving unit provided between the sliding member and the movable member, wherein the rotating member includes a regulating member, and wherein the movable member includes an engaging portion configured to be engageable with the regulating member in a rotation direction of the rotating member.

According to still another aspect of the present invention, there is provided an image blur correction apparatus configured to correct an image blur, comprising: a fixed member; a rotating member configured to be rotatable with respect to the fixed member in a plane parallel to a light receiving surface of the image sensor; a sliding member configured to be movable with respect to the fixed member in a first direction to translate the image sensor with respect to the fixed member in the plane; a movable member configured to hold the image sensor and be movable with respect to the sliding member in a second direction crossing the first direction; a first driving unit provided between the rotating member and the sliding member; and a second driving unit provided between the sliding member and the movable member, wherein the first driving unit and the second driving unit are configured to drive the movable member relative to the fixed member in the plane to correct the image blur by the image sensor, wherein the first driving unit is configured to rotate the rotating member in the plane to make a regulating member provided on the rotating member engage with an engaging portion provided on the movable member when the correction of the image blur is not to be performed, thereby regulating the translation of the movable member, and wherein the regulating member is configured to be disengaged from the engaging portion to enable the movable member to translate when the correction of the image blur is to be performed.

Note that in this specification, a plane perpendicular to a given axis indicates a plane almost perpendicular to the given axis to allow apparatus design errors. Similarly, a plane parallel to a given plane indicates a plane almost parallel to the given plane to allow apparatus design errors.

Further features of the present invention will become apparent from the following description of exemplary embodiments with reference to the attached drawings.

DESCRIPTION OF THE EMBODIMENTS

A mode for carrying out the present invention will now be described based on the following embodiments.

First Embodiment

Examples of the arrangements of a correction optical apparatus, an image blur correction apparatus, and an image capturing apparatus, which are configured to correct an image blur by a correction lens to which the present invention is applied and also regulate movement of the correction lens when the image blur correction is not to be performed, will be described as the first embodiment with reference to FIGS. 1 to 10.

Figure 6:
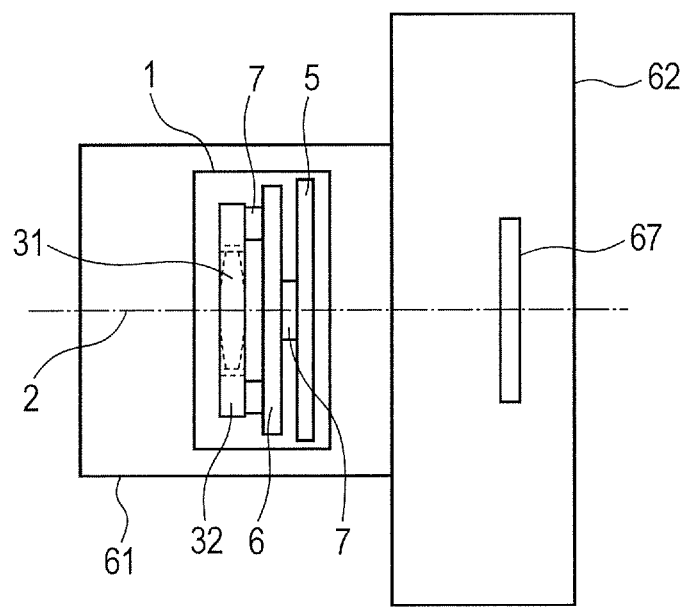
FIG. 6 is a sectional view of a camera when the correction optical apparatus according to the first embodiment of the present invention is constructed.

FIG. 6 is a sectional view of a camera serving as the image capturing apparatus according to this embodiment.

The camera shown in FIG. 6 has a function of capturing a moving image and a still image. The camera includes a lens barrel 61, and a camera body 62.

A correction optical apparatus 1 is incorporated in the lens barrel 61. The correction optical apparatus 1 according to this embodiment includes a correction lens 31, and a moving plate (movable member) 32 that holds the correction lens 31. The moving plate 32 is translated in a plane perpendicular an optical axis 2 of the correction optical apparatus by a driving device 7 provided on a rotating ring (rotating member) 5 and a sliding plate (sliding member) 6.

Although not illustrated in FIG. 6, the lens barrel 61 is provided with optical systems other than the correction lens 31, an acceleration sensor that detects the shake of the lens barrel 61, and an encoder that detects the two-dimensional movement of the moving plate 32.

There are also provided a power supply that supplies electric energy to the driving device and a control unit that processes the signal of the acceleration sensor and the signal of the encoder and operates the power supply.

The camera body 62 includes an image sensor 67. Light from an object passes through the optical system including the correction lens 31 in the lens barrel 61 and enters the image sensor 67 in the camera body 62. The camera is configured to be able to correct an image blur by causing the correction optical apparatus 1 to move the correction lens 31 based on the signal of the acceleration sensor.

Figure 1:
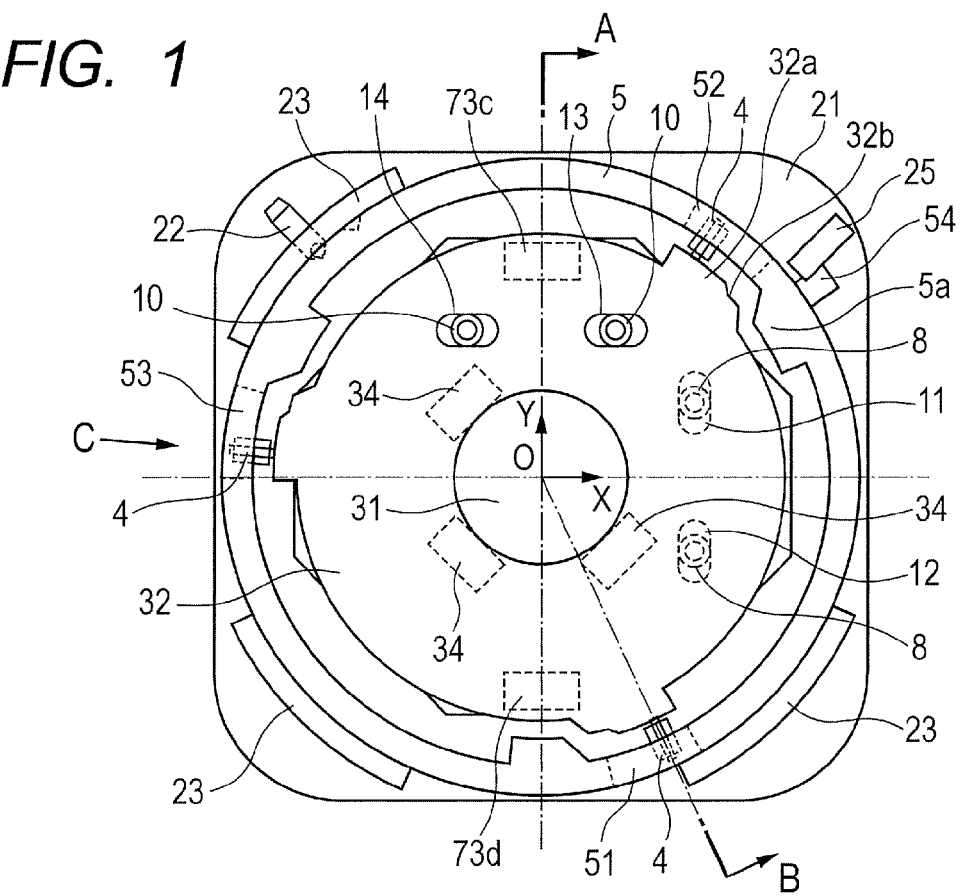
FIG. 1 is a plan view of a correction optical apparatus according to the first embodiment of the present invention.

FIG. 1 is a plan view of the correction optical apparatus 1 according to this embodiment.

The correction optical apparatus 1 is provided with a holding plate (fixing member) 21 that is a base member, and the rotating ring 5 supported to be rotatable with respect to the holding plate 21.

Arc-shaped guide portions 23 configured to guide the rotating ring 5 are provided at three portions of the holding plate 21.

The moving plate (movable member) 32 holding the correction lens 31 at the center is provided inside the rotating ring 5.

Figure 2:
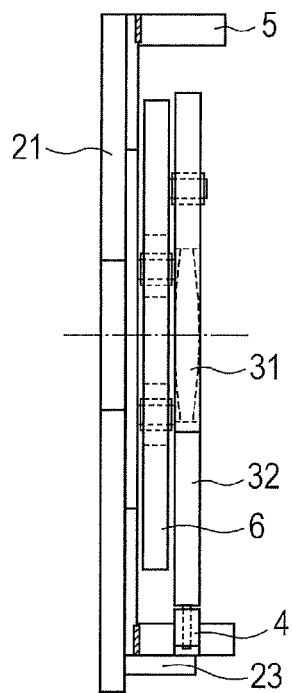
FIG. 2 is a sectional view of the correction optical apparatus according to the first embodiment of the present invention.

FIG. 2 is a sectional view of the correction optical apparatus taken along a path A-O-B in FIG. 1.

The octagonal sliding plate 6 is provided between the rotating ring 5 and the moving plate 32.

Figure 3:
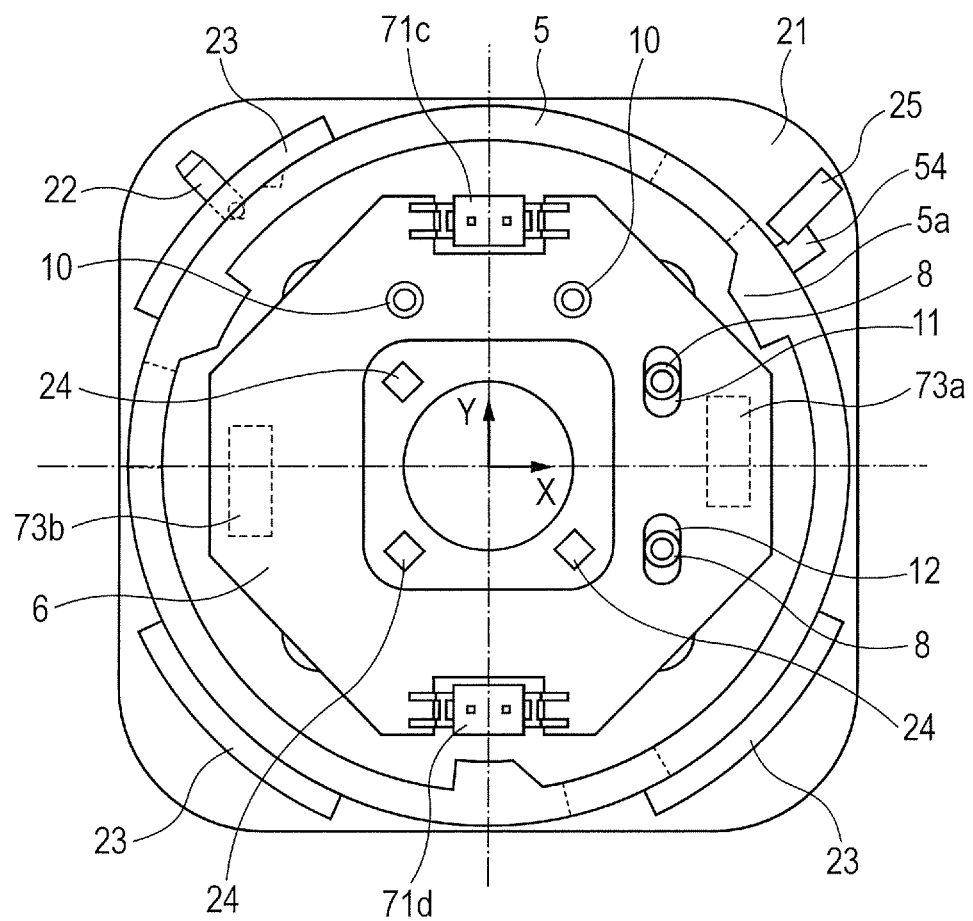
FIG. 3 is a plan view of the correction optical apparatus according to the first embodiment of the present invention in which the moving plate is removed.
Figure 4:
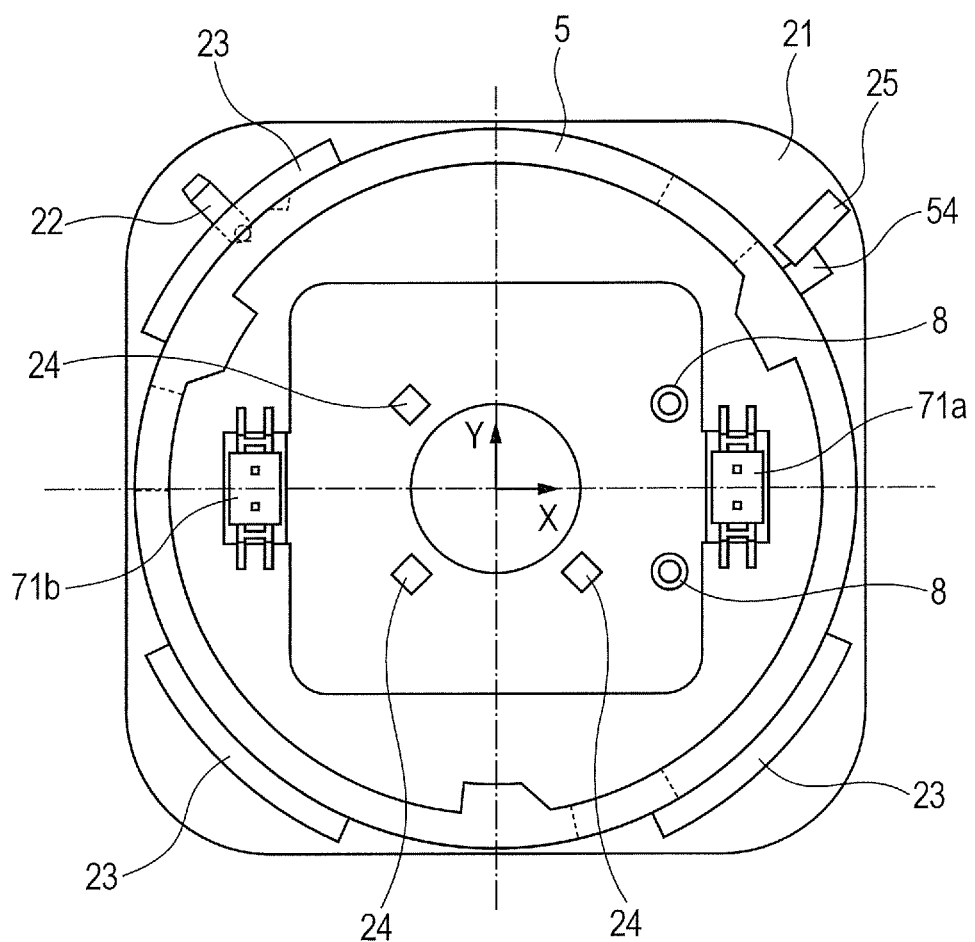
FIG. 4 is a plan view of the correction optical apparatus according to the first embodiment of the present invention in which the moving plate and the sliding plate are removed.

FIG. 3 is a plan view in which the moving plate 32 is removed, and FIG. 4 is a plan view in which the sliding plate 6 is also removed.

The holding plate 21 is provided with three encoders 24 that detect the position of the moving plate 32. Long holes 11 and 12 are formed at two portions in the sliding plate 6 in series along the Y direction. Long holes 13 and 14 are formed at two portions in the moving plate 32 in series along the X direction. Two rollers 8 are rotatably supported on the holding plate 21. The rollers 8 are inserted in the long holes 11 and 12 of the sliding plate 6, respectively. In addition, two rollers 10 are rotatably supported on the sliding plate 6. The rollers 10 are inserted in the long holes 13 and 14 of the moving plate 32, respectively.

The diameter of the rollers 8 and 10 is selected such that almost no play is formed with respect to the width of the long holes 11 to 14, and the rollers can rotate when moving in the longitudinal direction.

Hence, the sliding plate 6 can move only in the Y direction with respect to the holding plate 21, and the moving plate 32 can move only in the X direction with respect to the sliding plate 6.

With the above-described arrangement, the moving plate 32 can translate in the X and Y directions with respect to the holding plate 21 but cannot rotate with respect to the holding plate 21 even upon receiving a rotating force.

Projecting portions 32a projecting outward are provided at three portions of the moving plate 32. Rollers 4 are rotatably supported outward from the projecting portions 32a, respectively.

The rollers 4 at the three portions are inserted in guide holes 51, 52, and 53 formed in the cylindrical portion of the rotating ring 5, respectively.

Figure 10:
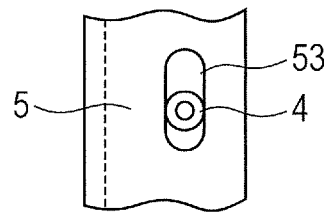
FIG. 10 is a side view of a part according to the first embodiment of the present invention.

FIG. 10 is a view observed in the direction of an arrow C in FIG. 1.

The diameter of the rollers 4 is selected such that almost no play is formed with respect to the width of the guide holes 51, 52, and 53, and the rollers can rotate when moving in the longitudinal direction of the guide holes, and can also move in the axial direction of the rollers 4.

With the above-described arrangement, the moving plate 32 can translate and rotate with respect to the rotating ring 5 but is regulated not to be movable in the optical axis direction. Note that the rotating ring 5 is also regulated by a member (not shown) not to be movable in the optical axis direction.

One of the arc-shaped guide portions 23 is provided with a ball plunger 22 to position the rotating ring 5 at its rotation position.

The positioning mechanism will be described with reference to FIGS. 5A to 5C. A ball 22a biased by an internal spring is exposed to the distal end of the ball plunger 22. When pressed by a predetermined press force, the ball 22a retracts. When the press force disappears, the ball returns to its original position.

A male screw is formed on the side surface of the ball plunger 22 and engages with a female screw formed on the arc-shaped guide portion 23. After positioning of the ball plunger 22, a nut 41 is tightened, thereby fixing the ball plunger 22.

Positioning grooves 55 and 56 are formed in the rotating ring 5. When the rotating ring is positioned at the position of FIG. 5A, the ball 22a of the ball plunger 22 fits in the positioning groove 55, and the rotating ring 5 is positioned at the rotation position in FIG. 5A.

Figure 5A:
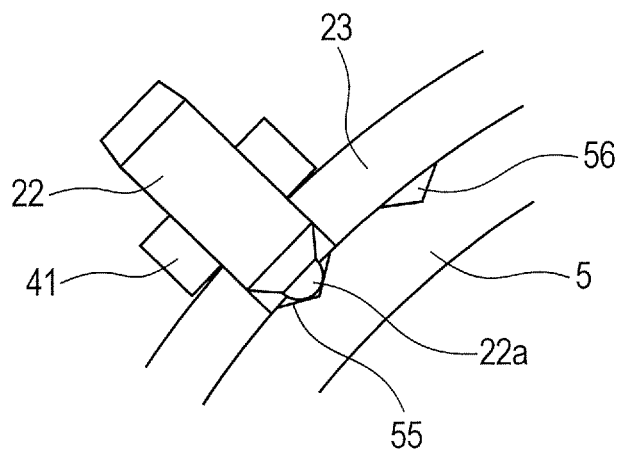
FIGS. 5A, 5B, and 5C are views of a positioning mechanism according to the first embodiment of the present invention.
Figure 5B:
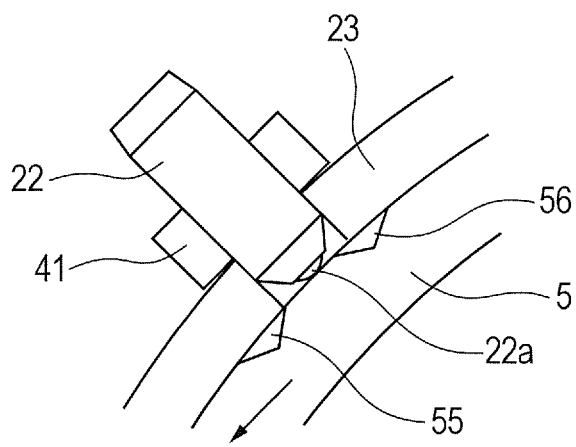

When a counterclockwise rotating force of a predetermined amount or more is applied to the rotating ring 5, the ball 22a is pressed by the slanting surface of the positioning groove 55 and retracts, and the rotating ring 5 rotates as shown in FIG. 5B.

Figure 5C:
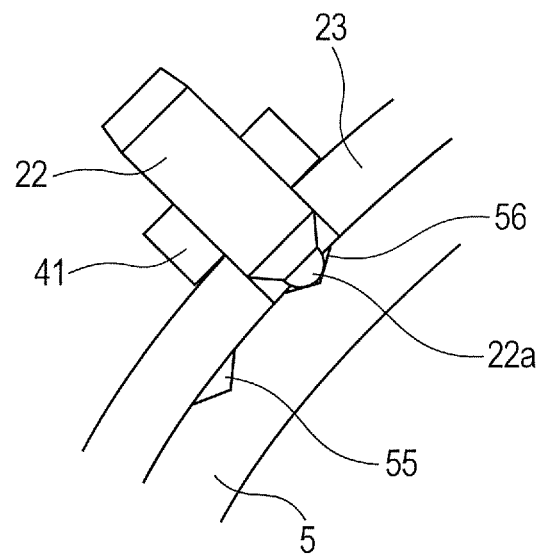

When the positioning groove 56 rotates up to the position of the ball 22a, as shown in FIG. 5C, the ball 22a is pressed by the biasing force of the spring again and fits in the positioning groove 56. At this time, when the rotating force acting on the rotating ring 5 disappears, the rotating ring 5 is positioned at the position shown in FIG. 5C.

To return the rotating ring 5 to the position in FIG. 5A, a clockwise rotating force of a predetermined amount or more is applied to the rotating ring 5.

As shown in FIGS. 1, 3, and 4, a photointerrupter 25 attached to the holding plate 21, and a light blocking plate 54 formed on the outer surface of the rotating ring 5 are provided as a detection unit for detecting the rotation position of the rotating ring 5.

When the rotating ring 5 is positioned at the position in FIGS. 5A to 5C, the light blocking plate 54 does not block the light of the photointerrupter 25. When the rotating ring 5 is positioned at the intermediate position, for example, the position shown in FIG. 5B, the light blocking plate 54 blocks the light of the photointerrupter 25.

Hence, when a signal representing that the light is blocked is output from the photointerrupter 25 after the rotating force is applied to the rotating ring 5, it can be detected that the rotating ring 5 has started rotating. When a signal representing that the light is received again is output, it can be detected that the rotating ring 5 has rotated up to a predetermined position.

As indicated by broken lines in FIG. 1, encoder scales 34 arranged at positions facing the encoders 24 are provided on the back side of the moving plate 32. The encoder scales 34 are large enough to cover the ranges of the encoders 24 even if the moving plate 32 moves to the maximum within its movable range.

As the driving device that translates the moving plate 32 for image blur correction, a vibration type actuator is used. The vibration type actuator is configured to apply a driving signal to an electromechanical energy conversion element provided in a vibrator, thereby exciting an elliptic motion by two, first and second bending modes having nodal lines almost perpendicular to each other and generating a driving force by friction at the contacting portion to the vibrator.

Figure 7:
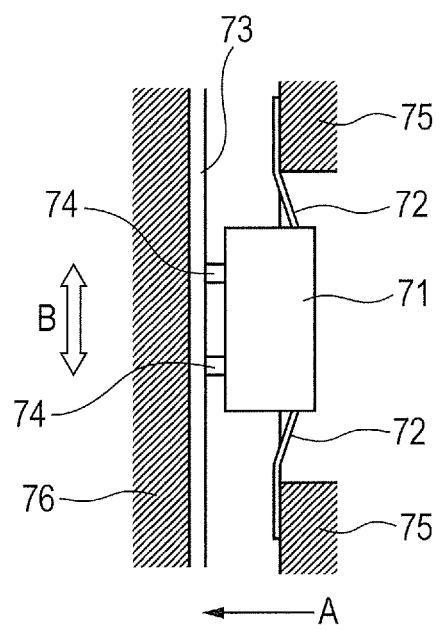
FIG. 7 is a sectional view of the periphery of a driving unit according to the first embodiment of the present invention.

FIG. 7 is a sectional view of the periphery of a vibration type actuator 71 serving as the driving device.

The vibration type actuator 71 is in contact with a friction plate (friction member) 73 fixed to a movable portion 76 in a state in which a leaf spring 72 fixed to a fixed portion 75 is bent.

When the leaf spring 72 is bent, two contact portions 74 provided on the vibration type actuator 71 always receive the biasing force of the leaf spring 72 in the direction of an arrow A in FIG. 7 and are in contact with the friction plate 73. When the contact portions 74 of the vibration type actuator 71 drive piezoelectric elements (electromechanical energy conversion elements) (not shown), two vibration modes are generated.

One is a thrusting mode that causes an vibration in the thrusting direction (direction of the arrow A in FIG. 7), and the other is a feeding mode that causes a vibration in the feeding direction (direction of an arrow B in FIG. 7). The two vibration modes are combined to cause an elliptic motion in the contact portions 74, and the driving force is transmitted to the friction plate 73 in the direction of the arrow B.

In this embodiment, four vibration type actuators are provided. Out of them, two vibration type actuators (first driving units) 71a and 71b are provided at bilaterally symmetrical positions of the rotating ring 5, as shown in FIG. 4.

Friction plates 73a and 73b corresponding to the vibration type actuators 71a and 71b are provided on the back surface of the sliding plate 6, as shown in FIG. 3. When the two vibration type actuators 71a and 71b are driven in the same direction, the sliding plate 6 moves in the Y direction (first direction) in FIG. 1.

Remaining two vibration type actuators (second driving units) 71c and 71d are provided at vertically symmetrical positions on the surface of the sliding plate 6. Friction plates 73c and 73d corresponding to the vibration type actuators 71c and 71d are provided on the back surface of the moving plate 32, as shown in FIG. 1.

When the two vibration type actuators 71c and 71d are driven in the same direction, the moving plate 32 moves in the X direction (second direction crossing the first direction) in FIG. 1.

The four vibration type actuators 71a to 71d are thus driven, thereby translating the moving plate 32 in a plane perpendicular to the optical axis.

A method of controlling the correction optical apparatus 1 in an image blur correction mode will be described next. In the image blur correction mode, first, the camera shake detection sensor (not shown) of the camera or the lens main body inputs an image blur amount to a CPU (not shown) for a lens driving unit (not shown).

The CPU calculates, from the received image blur amount, the driving amount of the correction optical system necessary to correct the image blur, and outputs driving amounts based on it to the four vibration type actuators 71a to 71d as driving signals. The vibration type actuators 71a to 71d generate driving forces based on the output signals and translate the moving plate 32 in a plane perpendicular to the optical axis.

The position information of the moving plate 32 is detected by causing the three encoders 24 provided on the holding plate 21 to read the encoder scales 34 and fed back to the CPU. The CPU calculates the driving amount of the correction optical system based on the position information fed back and an image blur amount newly input from the camera shake detection sensor, and outputs driving signals according to it to the vibration type actuators 71a to 71d.

The correction optical apparatus 1 continuously performs image blur correction by repetitively performing the above-described operation.

A method of locking and unlocking the moving plate 32 will be described next with reference to FIGS. 8 and 9.

An operation of shifting image blur correction from the on state to the off state, that is, the lock state will be described first.

Figure 8:
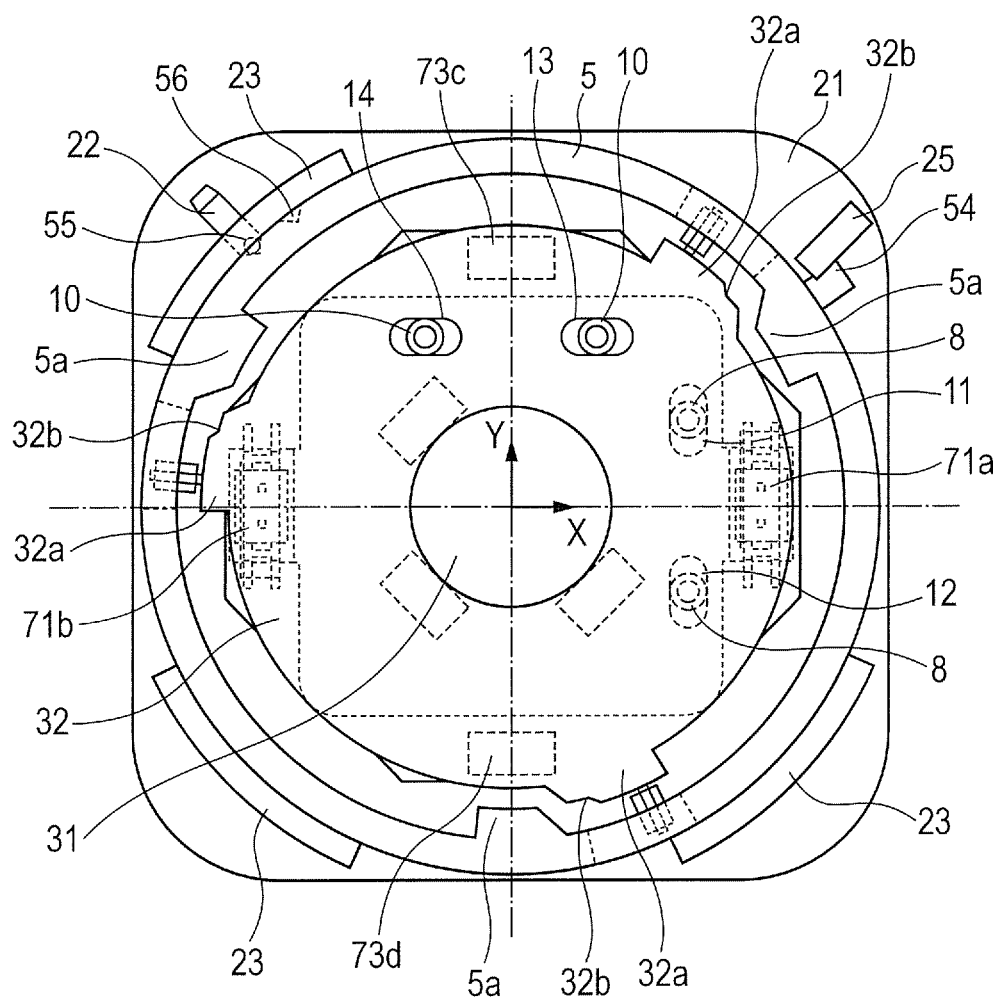
FIG. 8 is a plan view showing an unlocked state according to the first embodiment of the present invention.

In FIG. 8, image blur correction is on. At this time, the moving plate 32 is not in contact with the rotating ring 5 at any portion and can therefore translate in a plane perpendicular to the optical axis.

The rotating ring 5 is positioned at the position shown in FIG. 8 by the ball plunger 22 and also put aside by the biasing force of the ball plunger 22.

When the correction optical apparatus 1 receives an image blur correction off signal from the camera or the lens, the center of the correction lens 31 is made to almost match the optical axis. After that, the CPU outputs driving signals to only the vibration type actuators 71a and 71b. At this time, a driving signal to move the sliding plate 6 downward via the friction plate 73a is output to the vibration type actuator 71a, and a driving signal to move the sliding plate 6 upward via the friction plate 73b is output to the vibration type actuator 71b.

Hence, a clockwise rotating force acts on the sliding plate 6. However, the sliding plate 6 cannot rotate because it is supported by the rollers 8 and the long holes at the two portions so as to be movable only in the Y direction with respect to the holding plate 21.

However, since the vibration type actuators 71a and 71b are attached to the rotating ring 5 supported to be rotatable with respect to the holding plate 21, the reaction of the above-described rotating force acts on the rotating ring 5.

Figure 9:
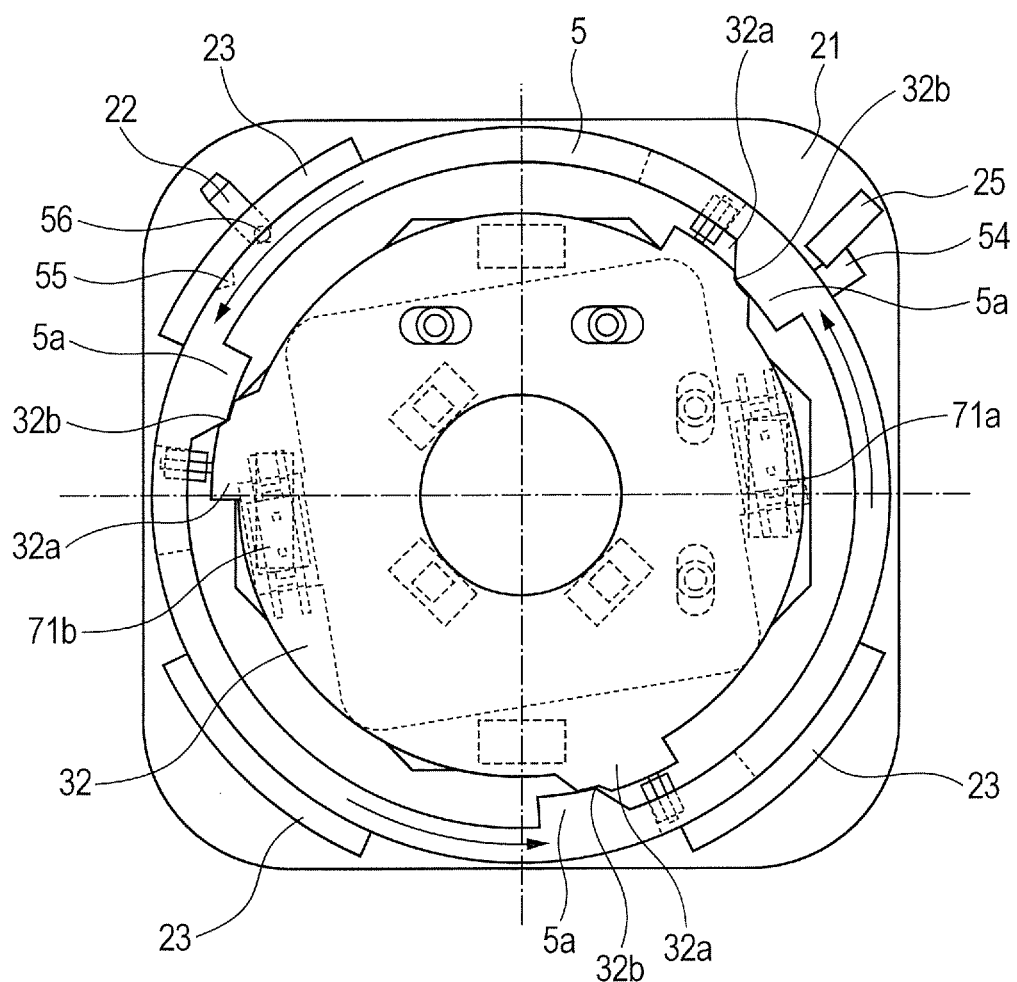
FIG. 9 is a plan view showing a locked state according to the first embodiment of the present invention.

Since the rotating force at this time is strong enough to push the ball 22a of the ball plunger 22 against the biasing force, the rotating ring 5 rotates in the counterclockwise direction indicated by arrows in FIG. 9.

When the photointerrupter 25 detects that the rotating ring 5 has rotated up to the position in FIG. 9, the driving signals to the vibration type actuators 71a and 71b are stopped.

When the ball 22a of the ball plunger 22 fits in the positioning groove 55, the rotating ring 5 is positioned at the position shown in FIG. 9.

At this time, projecting portions (regulating members) 5a of the rotating ring 5 engage with concave portions (engaging portions) 32b formed in the projecting portions 32a at the three portions of the moving plate 32. This regulates movement of the moving plate 32 in any direction, and the state shifts to the image blur correction off state, that is, the lock state.

A method of canceling the lock state will be described next. To cancel the lock and return to the image blur correction mode again, driving signals are output to the vibration type actuators 71a and 71b from the lock state shown in FIG. 9, and driving signals are given to apply a counterclockwise rotating force to the moving plate 32.

However, since the moving plate 32 cannot rotate with respect to the holding plate 21, as described above, the reaction of the rotating force is applied to the rotating ring 5 that supports the vibration type actuators 71a and 71b.

Since the rotating force at this time is strong enough to push the ball 22a of the ball plunger 22, the rotating ring 5 rotates clockwise. When the photointerrupter 25 detects that the rotating ring 5 has rotated up to the position in FIG. 8, the driving signals to the vibration type actuators 71a and 71b are stopped.

When the ball 22a of the ball plunger 22 fits in the positioning groove 56, the rotating ring 5 is positioned at the position shown in FIG. 8.

The projecting portions 5a of the rotating ring 5 disengage from the concave portions 32b, and a state in which the translation of the moving member is possible is obtained. The moving plate 32 and the rotating ring 5 are not in contact at any portion, and the state returns to the image blur correction on state.

The correction optical apparatus 1 is set in the image blur correction mode in the above-described way.

With the above-described arrangement, the correction lens driving unit can also serve as the rotation unit for the rotating ring (lock ring). Hence, another driving unit dedicated to the lock need not be provided.

It is therefore possible to provide a correction optical apparatus that reduces the cost, size, and power consumption. Note that in this embodiment, the two vibration type actuators 71a and 71b are provided on the rotating ring 5, and the corresponding friction plates 73a and 73b are provided on the back surface of the sliding plate 6. The remaining two vibration type actuators 71c and 71d are provided on the surface of the sliding plate 6, and the corresponding friction plates 73c and 73d are provided on the back surface of the moving plate 32. The positions of the vibration type actuators and the friction plates may be replaced.

Second Embodiment

An example of the arrangement that is the same as in the first embodiment except the driving unit will be described as the second embodiment with reference to FIG. 11.

In the first embodiment, a so-called vibration type actuator configured to apply a driving signal to an electromechanical energy conversion element provided in a vibrator, thereby exciting an elliptic motion by two, first and second bending modes having nodal lines almost perpendicular to each other and generating a driving force by friction at the contacting portion to the vibrator is used.

In the second embodiment, a so-called voice coil motor that is formed from a driving coil and a permanent magnet and converts electrical energy into mechanical energy using a magnetic flux generated by the permanent magnet is used as a driving unit in place of the vibration type actuator.

Figure 11:
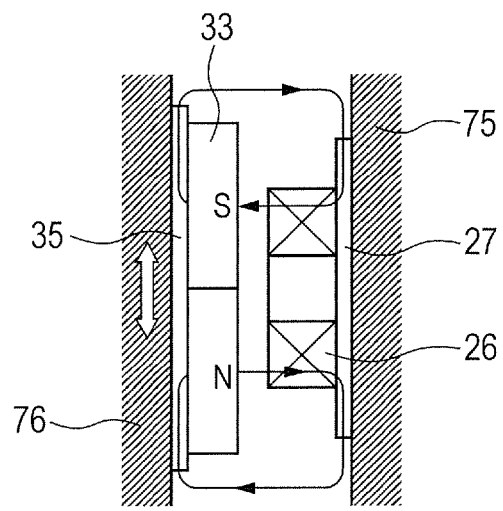
FIG. 11 is a sectional view of the periphery of a driving unit according to the second embodiment of the present invention.

FIG. 11 is a sectional view of the voice coil motor. In the state of FIG. 11, the center of a driving coil 26 is positioned on the center line of a permanent magnet 33.

The magnetic force of the permanent magnet 33 generates magnetic lines of force indicated by arrows in FIG. 11. Hence, when a current is supplied to the driving coil 26 to generate a magnetic field from right to left in FIG. 11, a force that moves a movable portion 76 downward is generated. When a current is supplied reversely, a force that moves the movable portion 76 upward is generated.

In this embodiment, four voice coil motors are provided. Two voice coil motors out of them are provided at bilaterally symmetrical positions between a rotating ring 5 and a sliding plate 6. When the voice coil motors are driven in the same direction, the sliding plate 6 moves in the vertical direction.

Remaining two voice coil motors are provided at vertically symmetrical positions between the sliding plate 6 and a moving plate 32. When the two voice coil motors are driven in the same direction, the moving plate 32 moves in the horizontal direction in FIG. 11.

The four voice coil motors are thus driven, thereby translating the moving plate 32 in a plane perpendicular to the optical axis.

To lock the moving plate 32, the voice coil motors provided between the sliding plate 6 and the rotating ring 5 are driven to generate forces in opposite directions, and the rotating ring 5 is rotated to lock the moving plate 32, as in the first embodiment.

Note that in this embodiment as well, the positions of the permanent magnet and the driving coil may be replaced.

Third Embodiment

An example of the arrangement of an image capturing apparatus that prevents an image blur by translating the image sensor will be described as the third embodiment with reference to FIG. 12.

In the first and second embodiments, the present invention is applied to an image capturing apparatus that prevents an image blur by translating a correction lens constituting part of the imaging lens. However, the present invention is also applicable to an image capturing apparatus that prevents an image blur by translating the image sensor, as in this embodiment. The image capturing apparatus of this embodiment includes a lens barrel 161 and a camera body 162 shown in FIG. 12.

The camera body 162 incorporates an image blur correction apparatus 101.

The image blur correction apparatus 101 according to this embodiment includes an image sensor 167, and a moving plate (movable member) 132 that holds the image sensor 167.

The moving plate 132 is configured to be translated in a plane perpendicular to an optical axis 2 of the correction optical apparatus by a driving device 107 provided on a sliding plate 106 and a rotating ring 105 supported to be rotatable with respect to a fixed member in a plane parallel to the light receiving surface of the image sensor.

The moving plate 132 is supported to be movable only in the X and Y directions, as in the first embodiment.

Figure 12:
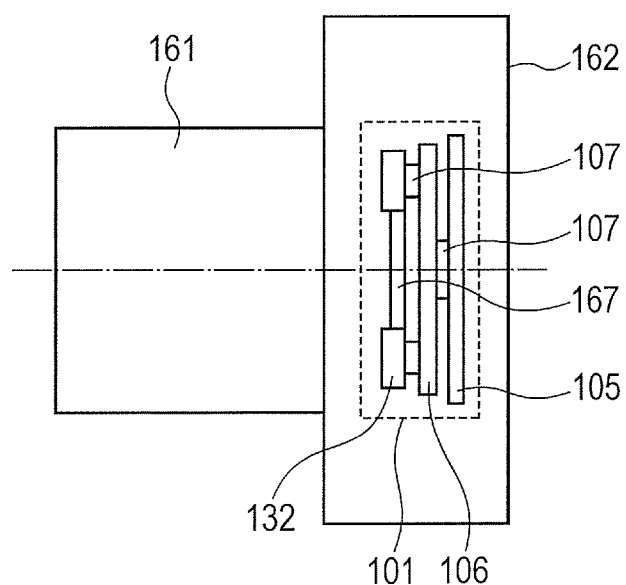
FIG. 12 is a sectional view of a camera when a correction optical apparatus according to the third embodiment of the present invention is constructed.

Although not illustrated in FIG. 12, the lens barrel 161 is provided with an imaging optical system, and the camera body 162 is provided with an acceleration sensor that detects a camera shake and an encoder that detects the two-dimensional movement of the moving plate 132.

There are also provided a power supply that supplies electric energy to the driving device and a control unit that processes the signal of the acceleration sensor and the signal of the encoder and operates the power supply.

The camera body 162 includes the image sensor 167. Light from an object passes through the imaging optical system in the lens barrel 161 and enters the image sensor 167. The camera is configured to correct an image blur by causing the image blur correction apparatus 101 to move the image sensor 167 based on the signal of the acceleration sensor.

The image sensor 167 translates in a plane perpendicular to the optical axis by giving driving forces to four driving devices each formed from a vibration type actuator and a friction plate as in the first embodiment. However, when the driving forces are given to the two driving devices provided on the rotating ring 105 out of the above-described driving devices so as to give a rotating force about the optical axis, the moving plate 132 does not rotate, but the rotating ring 105 can rotate by the reaction and lock the moving plate 132.

According to this embodiment, the image sensor driving unit can also serve as the rotation unit for the rotating ring (lock ring). Hence, another driving unit dedicated to the lock need not be provided. It is therefore possible to provide an image capturing apparatus that reduces the cost, size, and power consumption.

In addition, the image blur correction apparatus that moves the image sensor cannot rotate the image sensor to regulate the movement of the image sensor and fix it. Hence, the mechanism of the present invention is suitable.

Fourth Embodiment

An example of an arrangement in which the present invention is applied to a fine feed mechanism such as an X-Y stage will be described as the fourth embodiment.

In the first to third embodiments, the present invention is applied to an image capturing apparatus such as a camera. However, the present invention is also applicable to a fine feed mechanism such as an X-Y stage.

For example, a microscope used to observe a biological sample or the like uses a fine feed mechanism to position an arbitrary part of the observation target under microscopy.

If the movable portion, that is, the observation target placement portion can directly be translated by a plurality of driving unit, as in the present invention, the fine feed mechanism can be made thin, leading to size and weight reduction of the entire microscope. On the other hand, the fine feed mechanism of this type is preferably provided with a position regulating mechanism configured to fix the observation target placement portion to prevent breakage due to a shock at the time of transportation of the microscope or the like. Use of the present invention allows the driving unit of such a fine feed mechanism to serve as the driving unit of the position regulating mechanism configured to bring the observation target placement portion to a standstill as well. It is therefore possible to provide a fine feed mechanism that reduces the cost, size, and power consumption.

According to the present invention, it is possible to provide a correction optical apparatus, an image blur correction apparatus, and an image capturing apparatus which can reduce the size, cost, and power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-267686, filed Dec. 6, 2012, which is hereby incorporated by reference herein in its entirety.

What is claimed is:

1. A correction optical apparatus comprising:
a fixed member;
a rotating member configured to be rotatable with respect to the fixed member in a plane perpendicular to an optical axis of the correction optical apparatus;
a sliding member configured to be movable with respect to the fixed member in a first direction in the plane perpendicular to the optical axis of the correction optical apparatus;
a movable member configured to be movable with respect to the sliding member in a second direction crossing the first direction in the plane perpendicular to the optical axis of the correction optical apparatus;
a first driving unit provided between the rotating member and the sliding member; and a second driving unit provided between the sliding member and the movable member, wherein the rotating member includes a regulating member, and wherein the movable member includes an engaging portion configured to be able to engage with the regulating member in a rotation direction of the rotating member.

2. The apparatus according to claim 1, wherein each of the first driving unit and the second driving unit comprises a vibration type actuator including a vibrator including an electromechanical energy conversion element.

3. The apparatus according to claim 1, wherein the first driving unit includes a vibrator including an electromechanical energy conversion element and provided on one of the sliding member and the rotating member, wherein a friction member is provided on one of the rotating member and the sliding member.

4. An apparatus according to claim 1, wherein the second driving unit includes a vibrator including an electromechanical energy conversion element and provided on one of the sliding member and the movable member, wherein a friction member is provided on one of the movable member and the sliding member.

5. An apparatus according to claim 1, wherein each of the first driving unit and the second driving unit comprises a motor comprising a driving coil and a permanent magnet and converts electric energy into mechanical energy using a magnetic flux generated by the permanent magnet, and wherein the driving coil is provided on the rotating member, and the permanent magnet is provided on the movable member, or the driving coil is provided on the movable member, and the permanent magnet is provided on the driving coil.

6. An image capturing apparatus comprising the correction optical apparatus according to claim 1, and an image sensor provided at a position where light that has passed through a correction lens included in the correction optical apparatus enters.

7. A correction optical apparatus configured to correct an image blur, comprising:

a fixed member;

a rotating member configured to be rotatable with respect to the fixed member in a first plane perpendicular to an optical axis of the correction optical apparatus;

a sliding member configured to be movable with respect to the fixed member in a first direction to translate the correction lens with respect to the fixed member in the first plane;

a movable member configured to hold the correction lens and be movable with respect to the sliding member in a second direction crossing the first direction;

a first driving unit provided between the rotating member and the sliding member; and a second driving unit provided between the sliding member and the movable member, wherein the first driving unit and the second driving unit are configured to drive the movable member relative to the fixed member in a second plane perpendicular to the optical axis of the correction lens to correct the image blur by the correction lens, wherein the first driving unit is configured to rotate the rotating member in the second plane to make a regulating member provided on the rotating member engage with an engaging portion provided on the movable member when the correction of the image blur is not to be performed, thereby regulating the translation of the movable member, and wherein the regulating member is configured to be disengaged from the engaging portion to enable the movable member to translate when the correction of the image blur is to be performed.

8. The apparatus according to claim 7, wherein each of the first driving unit and the second driving unit comprises a vibration type actuator including a vibrator including an electromechanical energy conversion element.

9. The apparatus according to claim 7, wherein the first driving unit includes a vibrator including an electromechanical energy conversion element and provided on one of the sliding member and the rotating member, a friction member is provided on one of the rotating member and the sliding member.

10. The apparatus according to claim 7, wherein the second driving unit includes a vibrator including an electromechanical energy conversion element and provided on one of the sliding member and the movable member, a friction member is provided on one of the movable member and the sliding member.

11. The apparatus according to claim 7, wherein each of the first driving unit and the second driving unit comprises a motor comprising a driving coil and a permanent magnet and converts electric energy into mechanical energy using a magnetic flux generated by the permanent magnet, and wherein the driving coil is provided on the rotating member and the permanent magnet is provided on the movable member, or wherein the driving coil is provided on the movable member and the permanent magnet is provided on the driving coil.

12. An image capturing apparatus comprising the correction optical apparatus according to claim 7, and an image sensor provided at a position where light that has passed through a correction lens included in the correction optical apparatus enters.

13. An image blur correction apparatus comprising:

a fixed member;

a rotating member configured to be rotatable with respect to the fixed member in a plane parallel to a light receiving surface of an image sensor;

a sliding member configured to be movable with respect to the fixed member in a first direction in the plane;

a movable member configured to be movable with respect to the sliding member in a second direction crossing the first direction in the plane;

a first driving unit provided between the rotating member and the sliding member; and a second driving unit provided between the sliding member and the movable member, wherein the rotating member includes a regulating member, and wherein the movable member includes an engaging portion configured to be engageable with the regulating member in a rotation direction of the rotating member.

14. The apparatus according to claim 13, wherein each of the first driving unit and the second driving unit comprises a vibration type actuator including a vibrator including an electromechanical energy conversion element.

15. The apparatus according to claim 13, wherein the first driving unit includes a vibrator including an electromechanical energy conversion element and provided on one of the sliding member and the rotating member, wherein a friction member is provided on one of the rotating member and the sliding member, and wherein a driving force by friction of the vibrator is transmitted to one of the rotating member and the sliding member.

16. The apparatus according to claim 13, wherein the second driving unit includes a vibrator including an electromechanical energy conversion element and provided on one of the sliding member and the movable member, wherein a friction member is provided on one of the movable member and the sliding member, and wherein a driving force by friction of the vibrator is transmitted to one of the movable member and the sliding member.

17. The apparatus according to claim 13, wherein each of the first driving unit and the second driving unit comprises a motor comprising a driving coil and a permanent magnet and converts electric energy into mechanical energy using a magnetic flux generated by the permanent magnet, and wherein the driving coil is provided on the rotating member and the permanent magnet is provided on the movable member, or wherein the driving coil is provided on the movable member and the permanent magnet is provided on the driving coil.

18. An image capturing apparatus comprising the image blur correction apparatus according to claim 13, and an imaging optical system, wherein light that has passed through the imaging optical system enters an image sensor.

19. An image blur correction apparatus configured to correct an image blur comprising:

a fixed member;

a rotating member configured to be rotatable with respect to the fixed member in a plane parallel to a light receiving surface of the image sensor;

a sliding member configured to be movable with respect to the fixed member in a first direction to translate the image sensor with respect to the fixed member in the plane;

a movable member configured to hold the image sensor and be movable with respect to the sliding member in a second direction crossing the first direction;

a first driving unit provided between the rotating member and the sliding member; and a second driving unit provided between the sliding member and the movable member, wherein the first driving unit and the second driving unit are configured to drive the movable member relative to the fixed member in the plane to correct the image blur by the image sensor, wherein the first driving unit is configured to rotate the rotating member in the plane to make a regulating member provided on the rotating member engage with an engaging portion provided on the movable member when the correction of the image blur is not to be performed, thereby regulating the translation of the movable member, and wherein the regulating member is configured to be disengaged from the engaging portion to enable the movable member to translate when the correction of the image blur is to be performed.

20. The apparatus according to claim 19, wherein each of the first driving unit and the second driving unit comprises a vibration type actuator including a vibrator including an electromechanical energy conversion element.

* * * * *